United States Patent
Hashida

(10) Patent No.: US 9,664,205 B2
(45) Date of Patent: May 30, 2017

(54) HYDRAULIC DAMPER

(71) Applicant: ADVICS CO., LTD., Kariya, Aichi-pref. (JP)

(72) Inventor: Koichi Hashida, Kariya (JP)

(73) Assignee: ADVICS CO., LTD., Kariya, Aichi-Pref. (JP)

(*) Notice: Subject to any disclaimer, the term of this patent is extended or adjusted under 35 U.S.C. 154(b) by 77 days.

(21) Appl. No.: 14/719,989

(22) Filed: May 22, 2015

(65) Prior Publication Data

US 2015/0337868 A1 Nov. 26, 2015

(30) Foreign Application Priority Data

May 23, 2014 (JP) ................. 2014-106909

(51) Int. Cl.

| F16L 11/04 | (2006.01) |
|---|---|
| F15B 1/02 | (2006.01) |
| F04B 53/00 | (2006.01) |
| F04B 53/16 | (2006.01) |
| F15B 1/08 | (2006.01) |
| F04B 11/00 | (2006.01) |
| F16L 55/04 | (2006.01) |

(52) U.S. Cl.
CPC .............. *F15B 1/021* (2013.01); *F04B 11/00* (2013.01); *F04B 11/0008* (2013.01); *F04B 53/00* (2013.01); *F04B 53/16* (2013.01); *F15B 1/08* (2013.01); *F16L 55/04* (2013.01)

(58) Field of Classification Search
CPC ........ F15B 2201/205; F15B 2201/3152; F15B 2201/3158

USPC ...................................................... 138/26, 30
See application file for complete search history.

(56) References Cited

U.S. PATENT DOCUMENTS

| 2,851,059 A * | 9/1958 | Lucien | ...................... | F15B 1/10 |
|---|---|---|---|---|
| | | | | 138/30 |
| 3,003,522 A * | 10/1961 | Rohacs | ................. | F16L 55/052 |
| | | | | 138/30 |
| 3,433,268 A * | 3/1969 | Greer | ...................... | F15B 1/165 |
| | | | | 138/30 |
| 3,961,646 A * | 6/1976 | Schon | ..................... | F15B 1/106 |
| | | | | 138/26 |

(Continued)

FOREIGN PATENT DOCUMENTS

JP 2004-532957 A 10/2004

*Primary Examiner* — Patrick F Brinson
(74) *Attorney, Agent, or Firm* — Buchanan Ingersoll & Rooney PC

(57) ABSTRACT

A hydraulic damper disposed in a discharge-side passage of a hydraulic pump comprises a bladder made of elastic material and formed into a cylindrical shape, a core, and a plug. The bladder includes a spherical closed end portion at its one end and an open end portion at its the other end. The open end portion includes an annular flange portion extending outwardly in the radial direction. The core includes an inserted portion to be inserted into the bladder and an annular flange portion extending outwardly in the radial direction so as to contact with an end face of the open end portion of the bladder. The inserted portion has a large-diameter portion, a small-diameter portion and a gradually-changing diameter portion formed between the large-diameter portion and the small-diameter portion and forming an air chamber in the bladder together with the small chamber.

12 Claims, 3 Drawing Sheets

(56) References Cited

U.S. PATENT DOCUMENTS

| | | | | |
|---|---|---|---|---|
| 4,143,678 A | * | 3/1979 | Sugimura | F15B 1/08 138/30 |
| 4,364,416 A | * | 12/1982 | Jacobellis | F15B 1/10 138/30 |
| 4,448,217 A | * | 5/1984 | Mercier | F15B 1/10 138/30 |
| 6,651,698 B1 | * | 11/2003 | Wilkes | F16K 47/023 138/26 |
| 8,991,433 B2 | * | 3/2015 | Baseley | F15B 1/26 138/30 |
| 2004/0234400 A1 | | 11/2004 | Schepp et al. | |

* cited by examiner

US 9,664,205 B2

HYDRAULIC DAMPER

TECHNOLOGICAL FIELD

The present invention relates to a hydraulic damper and particularly to a hydraulic damper disposed in a discharge-side passage of a hydraulic pump to absorb discharge pulsation (a hydraulic pressure variation on a high-pressure side) of the hydraulic pump.

BACKGROUND DISCUSSION

This type of hydraulic damper is described, for example, in JP2004-532957 A. In the hydraulic damper described in JP2004-532957 A, an elastic wall member which is elastically deformed according to discharge pulsation (a hydraulic pressure variation on a high-pressure side) of a hydraulic pump is formed by two members, i.e., a plate-shaped sheet (diaphragm) made of spring steel and a rubber body for supporting the diaphragm.

In the hydraulic damper mentioned above, an outer periphery of the diaphragm is supported by the body, and when the diaphragm is elastically deformed according to the discharge pulsation (the hydraulic pressure variation on the high-pressure side) of the hydraulic pump, the outer periphery of the diaphragm scrapes against the body along with the elastic deformation of the diaphragm. Therefore, a hysteresis loss due to friction is large and it is difficult to obtain great hydraulic pressure variation absorbing effect (damper effect) with a small volume.

SUMMARY

The present invention has been made to achieve the above-described object (to obtain great hydraulic pressure variation absorbing effect (damper effect) with a small volume) and provides a hydraulic damper including: a bladder made of elastic material and formed into a cylindrical shape having a spherical closed end portion at its one end and an open end portion at its the other end, the open end portion including an annular flange portion extending outwardly in the radial direction; a core including an inserted portion to be inserted into the bladder and an annular flange portion extended outwardly in the radial direction and contacted with an end face of the open end portion of the bladder, the inserted portion having a large-diameter portion to be fitted in the open end portion of the bladder to seal the open end portion in a liquid-tight manner, a small-diameter portion extending in the bladder from the large-diameter portion toward the spherical closed end portion of the bladder and a gradually-changing diameter portion formed between the large-diameter portion and the small-diameter portion and forming an air chamber in the bladder together with the small chamber; and a plug accommodating the annual flange portion of the bladder and the annual flange portion of the core and binding the bladder to the core at the annual flange portion of the bladder and the annual flange portion of the core, wherein the hydraulic damper is disposed in a discharge-side passage of a hydraulic pump.

In carrying out the above-described invention, an inner diameter of a cylindrical portion of the bladder may be less than or equal to half of an outer diameter of the cylindrical portion of the bladder, or an outer diameter of the small-diameter portion of the core may be set on the basis of a buckling load of a cylindrical portion of the bladder under external pressure and an inner surface of the cylindrical portion of the bladder may come in contact with the small-diameter portion of the core in response to the external pressure so as to restrict buckling deformation of the cylindrical portion of the bladder.

In the hydraulic damper according to the invention, during use of the hydraulic damper, when the discharge pulsation (hydraulic pressure variation on the high-pressure side) of the hydraulic pump is applied to an outer side of the bladder, the bladder is elastically compressed and deformed toward the air chamber according to the discharge pulsation (hydraulic pressure variation on the high-pressure side). At this time, because the bladder except around its open end portion is not frictionally engaged with the core, it is possible to absorb the hydraulic pressure variation on the high-pressure side while minimizing a hysteresis loss due to the friction. Therefore, it is possible to obtain great hydraulic pressure variation absorbing effect (damper effect) with a small volume. Furthermore, in the hydraulic damper according to the invention, the air chamber is sealed in the liquid-tight manner (hermetically). Therefore, when the bladder is elastically compressed and deformed toward the air chamber, the air chamber functions as an air spring and contributes to increase in pressure resistance of the bladder.

BRIEF DESCRIPTION OF THE DRAWING FIGURES

DETAILED DESCRIPTION

Figure 1:
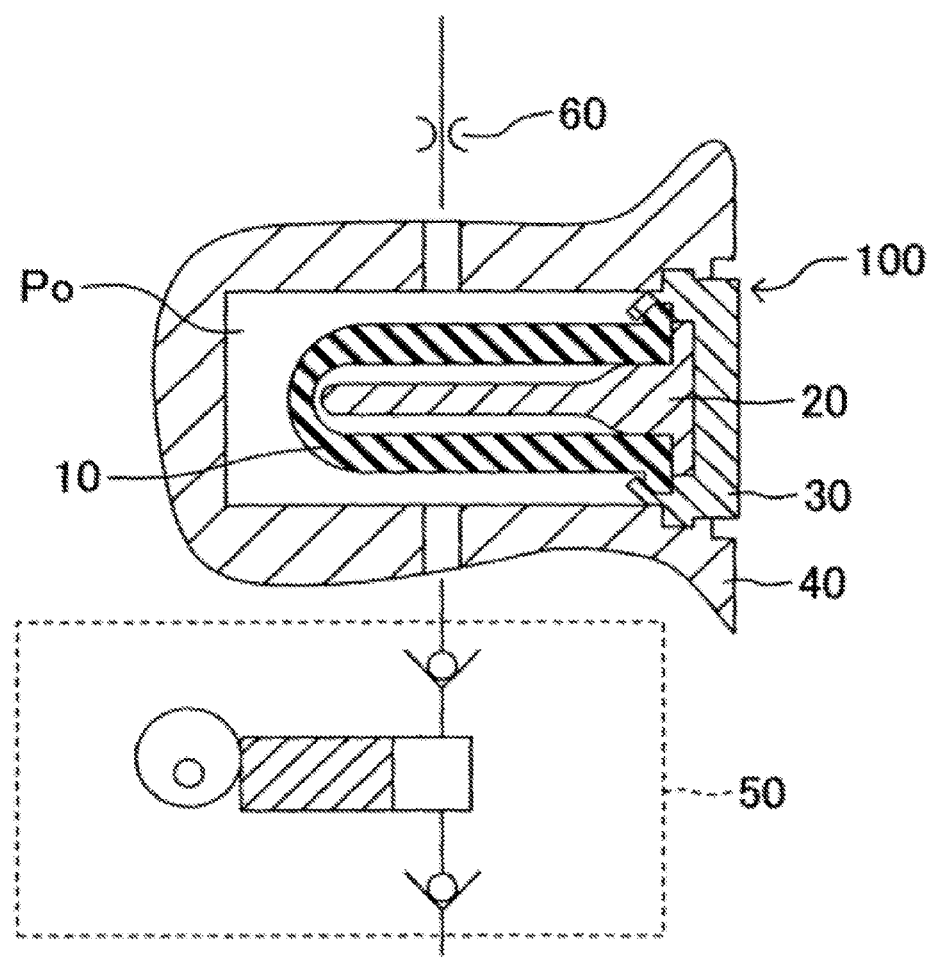
FIG. 1 is a schematic overall block diagram showing an embodiment of a hydraulic damper according to the invention.
Figure 2:
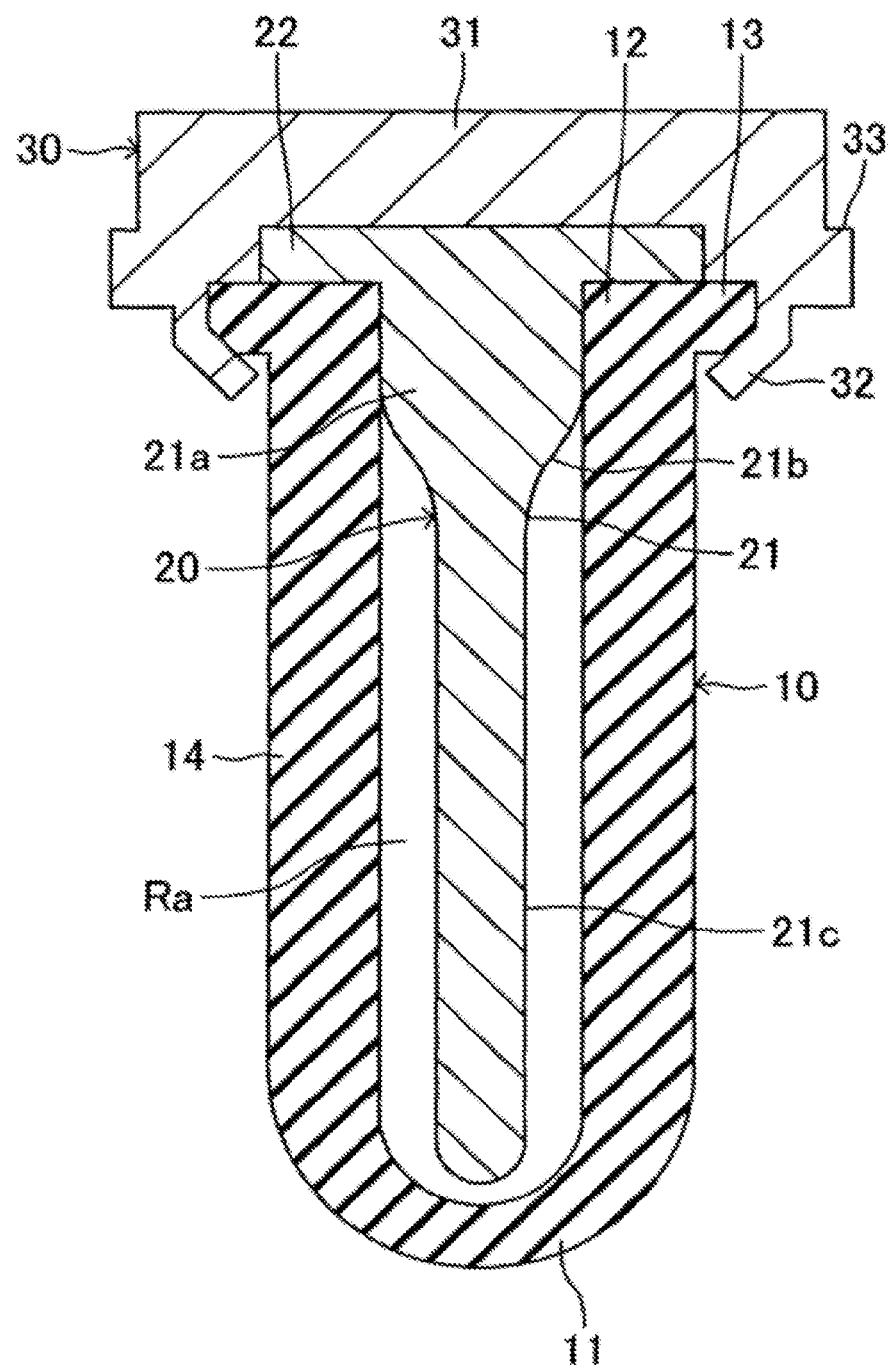
FIG. 2 is an enlarged sectional view of main component members of the hydraulic damper shown in FIG. 1.

Hereinafter, preferred embodiments of the present invention will be described with reference to the drawings. FIGS. 1 and 2 show an embodiment of a hydraulic damper according to the invention, and the hydraulic damper 100 in the embodiment includes a bladder 10 made of elastic material such as rubber (e.g., ethylene-propylene rubber), a core 20 made of hard material such as metal (e.g., stainless steel), and a plug 30 made of hard material such as metal (e.g., stainless steel) and is mounted into a housing (body of an actuator) 40 by the plug 30 and disposed in a discharge-side passage Po of a hydraulic pump 50. A throttle 60 is disposed on an outlet side of the hydraulic damper 100 and a flow rate variation in synchronization with rotation of the hydraulic pump 50 is converted into a hydraulic pressure variation with high-pressure.

As shown in FIG. 2, the bladder 10 is formed into a cylindrical shape having a spherical closed end portion 11 at its one end (a lower tip end in FIG. 2) and an open end portion 12 at its the other end (an upper base end in FIG. 2). Namely, the bladder 10 has a cylindrical shape except the spherical closed end portion 11. An annular flange portion 13 which is extended outwardly in the radial direction is integrally formed at the open end portion 12. A cylindrical portion 14 of the bladder 10 has an inner diameter which is half of its outer diameter and has a thick wall or thick structure. The cylindrical portion 14 may have an inner diameter equal to or smaller than a half of its outer diameter.

The core 20 includes an inserted portion 21 to be inserted into the bladder 10 and an annular flange portion 22 which is extended outwardly in the radial direction and which is contacted with an open end face of the open end portion 12 of the bladder 10. The inserted portion 21 includes a large-diameter portion 21a to be fitted in the open end portion 12 of the bladder 10 to seal the open end portion 12 in a liquid-tight manner, a small-diameter portion 21c extending in the bladder 10 from the large-diameter portion 21a toward the spherical closed end portion 11 of the bladder 10 and a gradually-changing diameter portion 21b formed between the large-diameter portion 21a and the small-diameter portion 21c. The gradually-changing diameter portion 21b and the small-diameter portion 21c define and form an air chamber Ra in the bladder 10. A tip end of the small-diameter portion 21c is formed into a spherical shape.

A thickness (outer diameter) of the small-diameter portion 21c of the core 20 is set on the basis of a buckling load (which can be obtained in advance by an analysis) of the cylindrical portion 14 of the bladder 10 under external pressure. Therefore, the inner diameter of the cylindrical portion 14 of the bladder 10 comes in contact with an outer periphery of the small-diameter portion 21c of the core 20 to thereby restrict buckling deformation of the cylindrical portion 14 of the bladder 10. Although an entire sectional shape of the gradually-changing diameter portion 21b is formed by curved lines, a sectional shape of a middle portion of the gradually-changing diameter portion 21b may be formed by straight lines (the middle portion may be formed in a shape of a circular truncated cone).

The plug 30 includes a main body portion 31 for housing or accommodating the annual flange portion 13 of the bladder 10 and the annual flange portion 22 of the core 20, an annular binding portion 32 for binding the bladder 10 to the core 20 at the annual flange portions 13 and 22, and an annular step portion 33 to be fixed to the housing 40. By swaging a portion of the binding portion 32, the bladder 10 is bound or fixed to the core 20 and the bladder 10, the core 20, and the plug 30 are integrated with each other. At the annular step portion 33, as shown in FIG. 1, by swaging a portion of the housing 40, the plug 30 is fixed to the housing 40 in a liquid-tight manner.

In the hydraulic damper 100 formed as described above in this embodiment, during use of the hydraulic damper 100, when the discharge pulsation ((hydraulic pressure variation on the high-pressure side) of the hydraulic pump 50 is applied to an outer side of the bladder 10, the bladder 10 is elastically compressed and deformed toward the air chamber Ra according to the hydraulic pressure variation with the high-pressure. At this time, because the bladder 10 except around its open portion is not frictionally engaged with the core 20, it is possible to absorb the hydraulic pressure variation with the high-pressure while minimizing a hysteresis loss due to the friction. Therefore, it is possible to obtain great hydraulic pressure variation absorbing effect (damper effect) with a small volume. In the hydraulic damper 100 in this embodiment, the air chamber Ra is sealed in the liquid-tight manner (hermetically). Therefore, when the bladder 10 is elastically compressed and deformed toward the air chamber Ra, the air chamber Ra functions as an air spring and contributes to increase in pressure resistance of the bladder 10.

In the hydraulic damper 100 in this embodiment, the cylindrical portion 14 of the bladder 10 has the inner diameter which is half of its outer diameter and has the thick wall or thick structure. Therefore, it is possible to increase the buckling load of the bladder 10 under the external pressure to sufficiently enhance the pressure resistance of the hydraulic damper 100.

In the hydraulic damper 100 in the embodiment, the outer diameter of the small-diameter portion 21c of the core 20 is set on the basis of the buckling load of the cylindrical portion 14 of the bladder 10 under the external pressure, and the inner diameter of the cylindrical portion 14 of the bladder 10 comes in contact with the small-diameter portion 21c of the core 20 to thereby restrict buckling deformation of the cylindrical portion 14 of the bladder 10. Therefore, the small-diameter portion 21c of the core 20 restricts the buckling deformation of the cylindrical portion 14 of the bladder 10 to thereby prevent partial excessive deformation of the bladder 10. As a result, it is possible to improve durability of the hydraulic damper 100.

Figure 3:
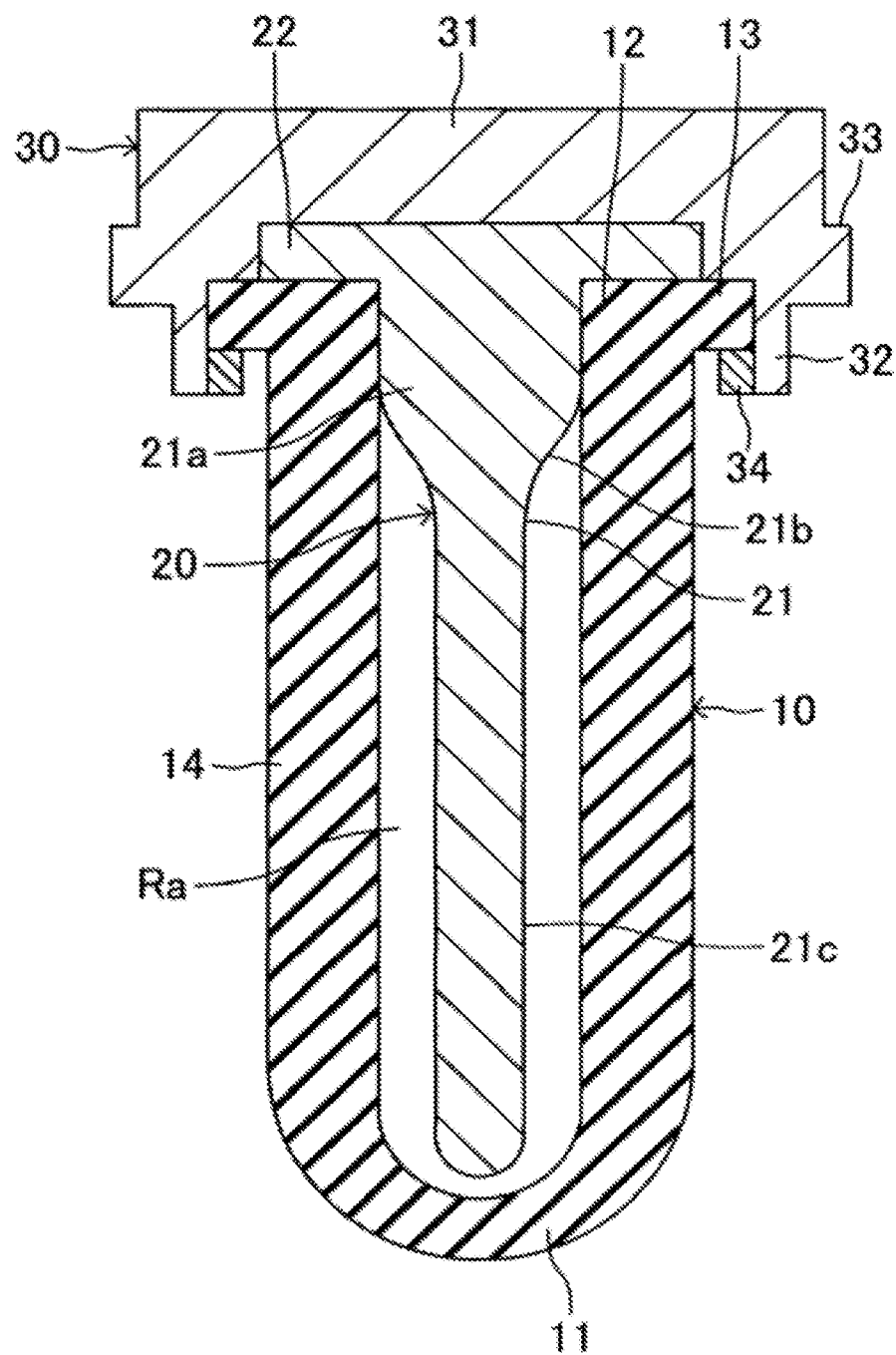
FIG. 3 is a sectional view of another embodiment of a plug in the hydraulic damper according to the invention and corresponding to FIG. 2.

Although the bladder 10 is bound to the core 20 by swaging the portion of the binding portion 32 of the plug 30 in the above-described embodiment as shown in FIG. 2, it is able to use a structure in an embodiment shown in FIG. 3 as substitute for the structure shown in FIG. 2. In the embodiment shown in FIG. 3, a binding ring 34 is fitted and fixed by press-fitting into a binding portion (cylindrical portion) 32 of a plug 30 to prevent a bladder 10 from coming off a core 20.

The detailed description above describes features and aspects of embodiments of a hydraulic damper disclosed by way of example. The invention is not limited, however, to the precise embodiments and variations describes. Changes, modifications and equivalents can be employed by one skilled in the art without departing from the spirit and scope of the invention as defined in the appended claims. It is expressly intended that all such changes, modifications and equivalents which fall within the scope of the claims are embraces by the claims.

What is claimed is:
1. A hydraulic damper comprising:
a bladder made of elastic material and possessing a cylindrical shape, the bladder possessing one end and an other end, the bladder comprising a spherical closed end portion at the one end and an open end portion at the other end, the open end portion including an annular flange portion extending outwardly in the radial direction, the open end portion comprising an end face;
a core including an inserted portion positioned within the bladder and an annular flange portion extending outwardly in the radial direction and contacting the end face of the open end portion of the bladder;
the inserted portion comprising a large-diameter portion, a small-diameter portion and a gradually-changing diameter portion, the large-diameter portion being fitted in the open end portion of the bladder to seal the open end portion in a liquid-tight manner, the small-diameter portion extending in the bladder from the large-diameter portion toward the spherical closed end portion of the bladder, and the gradually-changing diameter portion being between the large-diameter portion and the small-diameter portion and forming an air chamber in the bladder together with the small-diameter portion, the small-diameter portion of the inserted portion of the core possessing a distal-most end, the distal-most end of the small diameter portion of the inserted portion of the core being spherically shaped; and
a plug accommodating the annual flange portion of the bladder and the annual flange portion of the core and binding the bladder to the core at the annual flange portion of the bladder and the annual flange portion of the core, wherein the hydraulic damper is disposed in a discharge-side passage of a hydraulic pump.

2. The hydraulic damper according to claim 1, wherein the bladder comprises a cylindrical portion which possesses an inner diameter and an outer diameter, and the inner diameter of a cylindrical portion of the bladder is less than or equal to half of the outer diameter of the cylindrical portion of the bladder.

3. The hydraulic damper according to claim 1, wherein an outer diameter of the small-diameter portion of the core is set on the basis of a buckling load of a cylindrical portion of the bladder under external pressure and an inner surface of the cylindrical portion of the bladder comes in contact with the small-diameter portion of the core in response to the external pressure so as to restrict buckling deformation of the cylindrical portion of the bladder.

4. The hydraulic damper according to claim 2, wherein an outer diameter of the small-diameter portion of the core is set on the basis of a buckling load of the cylindrical portion of the bladder under external pressure and an inner surface of the cylindrical portion of the bladder comes in contact with the small-diameter portion of the core in response to the external pressure so as to restrict buckling deformation of the cylindrical portion of the bladder.

5. The hydraulic damper according to claim 1, further comprising
a housing, the entirety of the outer surface of the closed end of the bladder being exposed within the housing.

6. The hydraulic damper according to claim 5, wherein the small-diameter portion extends within the bladder and comprises a proximal-most end connected to the distal end of the gradually-changing diameter portion and a distal-most end extending towards the closed end of the bladder, and
the small-diameter portion possesses an outer diameter, the outer diameter of distal-most end of the small-diameter portion being not greater than the outer diameter of the proximal-most end of the small-diameter portion.

7. A hydraulic damper comprising:
a housing;
a bladder positioned within the housing, the bladder being made of an elastic material, the bladder extending in a longitudinal direction from a closed end to an open end opposite to the closed end of the bladder, the open end including an annular flange portion extending outwardly in a radial direction, the open end comprising an end face and possessing an inner surface, the closed end of the bladder possessing an outer surface;
a core including an inserted portion positioned within the bladder and an annular flange portion extending outwardly in the radial direction and contacting the end face of the open end of the bladder;
the inserted portion comprising a large-diameter portion, a small-diameter portion and a gradually-changing diameter portion between the large-diameter portion and the small-diameter portion, the large-diameter portion possessing an outer surface in contact with the inner surface of the open end of the bladder to seal the open end in a liquid-tight manner, the small-diameter portion extending within the bladder from the large-diameter portion toward the closed end of the bladder, and the gradually-changing diameter portion being between the large-diameter portion and the small-diameter portion, the gradually-changing diameter portion possessing an outer surface and the small-diameter portion possessing an outer surface;
an air chamber within the bladder between the outer surface of the small-diameter portion, the outer surface of the gradually-changing diameter portion and the inner surface of the bladder;
a plug accommodating the annual flange portion of the bladder and the annual flange portion of the core and binding the bladder to the core at the annual flange portion of the bladder and the annual flange portion of the core; and
the entirety of the outer surface of the closed end of the bladder being exposed within the housing.

8. The hydraulic damper according to claim 7, wherein the bladder comprises a cylindrical portion which possesses an inner diameter and an outer diameter, and
the inner diameter of a cylindrical portion of the bladder is less than or equal to half of the outer diameter of the cylindrical portion of the bladder.

9. The hydraulic damper according to claim 7, wherein an outer diameter of the small-diameter portion of the core is set on the basis of a buckling load of a cylindrical portion of the bladder under external pressure and an inner surface of the cylindrical portion of the bladder comes in contact with the small-diameter portion of the core in response to the external pressure so as to restrict buckling deformation of the cylindrical portion of the bladder.

10. A hydraulic damper comprising:
a bladder being made of an elastic material, the bladder extending in a longitudinal direction from a closed end to an open end opposite to the closed end of the bladder, the open end including an annular flange portion extending outwardly in a radial direction, the open end comprising an end face and possessing an inner surface, the closed end of the bladder possessing an outer surface;
a core including an inserted portion positioned within the bladder and an annular flange portion extending outwardly in the radial direction and contacting the end face of the open end of the bladder, the core possessing a distal-most end;
the inserted portion comprising a large-diameter portion, a small-diameter portion and a gradually-changing diameter portion between the large-diameter portion and the small-diameter portion, the large-diameter portion possessing an outer surface in contact with the inner surface of the open end of the bladder to seal the open end in a liquid-tight manner, the gradually-changing diameter portion comprising a proximal end connected to the large-diameter portion and a distal end connected to the small-diameter portion, the gradually-changing diameter portion possessing an outer diameter, the outer diameter of the gradually-changing diameter portion decreasing from the proximal end to the distal end;
the small-diameter portion extending within the bladder and comprising a proximal-most end connected to the distal end of the gradually-changing diameter portion and a distal-most end extending towards the closed end of the bladder, the small-diameter portion possessing an outer diameter, the outer diameter of distal-most end of the small-diameter portion being not greater than the outer diameter of the proximal-most end of the small-diameter portion, the distal-most end of the small-diameter portion being the distal-most end of the core;
an air chamber within the bladder between the outer surface of the small-diameter portion, the outer surface of the gradually-changing diameter portion and the inner surface of the bladder; and a plug accommodating the annual flange portion of the bladder and the annual flange portion of the core and binding the bladder to the core at the annual flange portion of the bladder and the annual flange portion of the core.

11. The hydraulic damper according to claim 10, wherein the bladder comprises a cylindrical portion which possesses an inner diameter and an outer diameter, and the inner diameter of a cylindrical portion of the bladder is less than or equal to half of the outer diameter of the cylindrical portion of the bladder.

12. The hydraulic damper according to claim 10, wherein an outer diameter of the small-diameter portion of the core is set on the basis of a buckling load of a cylindrical portion of the bladder under external pressure and an inner surface of the cylindrical portion of the bladder comes in contact with the small-diameter portion of the core in response to the external pressure so as to restrict buckling deformation of the cylindrical portion of the bladder.

\* \* \* \* \*